(12) United States Patent
Iwase et al.

(10) Patent No.: US 7,811,191 B2
(45) Date of Patent: Oct. 12, 2010

(54) CONTROL APPARATUS FOR VEHICULAR DRIVE SYSTEM

(75) Inventors: Yuji Iwase, Mishima (JP); Masahiro Kojima, Toyota (JP); Ryuji Ibaraki, Nishikamo-gun (JP); Atsushi Tabata, Okazaki (JP); Tatsuya Imamura, Okazaki (JP); Takuma Kakinami, Toyota (JP); Natsuki Sada, Anjo (JP); Tomoo Atarashi, Kariya (JP); Nobukazu Ike, Kariya (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 58 days.

(21) Appl. No.: 12/379,798

(22) Filed: Mar. 2, 2009

(65) Prior Publication Data
US 2009/0258747 A1 Oct. 15, 2009

Related U.S. Application Data

(63) Continuation of application No. 12/216,415, filed on Jul. 3, 2008, now abandoned.

(30) Foreign Application Priority Data
Jul. 6, 2007 (JP) .............................. 2007-179082

(51) Int. Cl.
*F16H 57/02* (2006.01)
(52) U.S. Cl. .......................... 475/5; 74/606 R; 903/952
(58) Field of Classification Search ................. 475/116, 475/150; 903/952
See application file for complete search history.

(56) References Cited

U.S. PATENT DOCUMENTS

| 7,396,308 B2 | 7/2008 | Tabata et al. |
| 2004/0147353 A1* | 7/2004 | Bowen ........................... 475/5 |
| 2005/0221939 A1* | 10/2005 | Takami et al. .................. 475/5 |

FOREIGN PATENT DOCUMENTS

JP A-61-96262 5/1986

(Continued)

*Primary Examiner*—Sherry L Estremsky
*Assistant Examiner*—Edwin A. Young
(74) *Attorney, Agent, or Firm*—Oliff & Berridge, PLC

(57) ABSTRACT

A vehicular power transmitting system including a transmission portion constituting a part of a power transmitting path, an electric motor connected to the power transmitting path, an electrically controlled differential portion connected to the electric motor and having a differential state controllable according to a change of an operating speed of the electric motor, a casing accommodating the transmission portion, the electric motor and the electrically controlled differential portion, and a support member for supporting a rotor of the electric motor, the support member including a support portion formed in one axial end portion thereof, at which the rotor is supported rotatably about its axis, and a tapered portion having a diameter increasing in an axial direction from the one axial end portion toward the other axial end portion at which the support member is fixed to the casing, and wherein a winding portion of a stator of the electric motor is disposed in a space formed radially outwardly of the tapered portion, while a fluid passage portion for supplying a working fluid to frictional coupling devices of the transmission portion is disposed in a space formed radially inwardly of the tapered portion.

19 Claims, 8 Drawing Sheets

FOREIGN PATENT DOCUMENTS

| | | |
|---|---|---|
| JP | A-10-000949 | 1/1998 |
| JP | A-2000-135931 | 5/2000 |
| JP | A-2000-193048 | 7/2000 |
| JP | A-2001-187535 | 7/2001 |
| JP | A-2006-94680 | 4/2006 |
| JP | A-2006-175951 | 7/2006 |

* cited by examiner

|       | C0 | C1 | C2 | C3 | B0 | B1 | B2 | SPEED RATIO | STEPPING RATIO |
|-------|----|----|----|----|----|----|----|-------------|----------------|
| 1st   | ◎  | ○  |    |    |    |    | ○  | 4.250       | 1.428          |
| 2nd   |    | ○  |    |    | □  |    | ○  | 2.976       | 1.429          |
| 3rd   | ◎  | ○  |    |    |    | ○  |    | 2.083       | 1.428          |
| 4th   |    | ○  |    |    | □  | ○  |    | 1.459       | 1.459          |
| 5th   | ◎  | ○  | ○  |    |    |    |    | 1.000       | 1.499          |
| 6th   | ◎  |    | ○  |    |    | ○  |    | 0.667       | 1.428          |
| 7th   |    |    | ○  |    | □  | ○  |    | 0.467       | SPREAD 9.104   |
| R (ENGINE DRIVE) |    |    | ○ |    |    |    | ○ | 2.000 |  |
| R (MOTOR DRIVE)  |    | ○  |    |    |    |    | ○ | 2.000 |  |
| N     |    |    |    |    |    |    | ○  |             |                |

○ ENGAGED

◎ ENGAGED FOR STEP-VARIABLE SHIFTING,
    AND RELEASED FOR CONTINUOUSLY-VARIABLE SHIFTING

□ ENGAGED ONLY FOR STEP-VARIABLE SHIFTING

CONTROL APPARATUS FOR VEHICULAR DRIVE SYSTEM

This is a Continuation of Application No. 12/216,415 filed Jul. 3, 2008. The disclosure of the prior application is hereby incorporated by reference herein in its entirety.

The present application claims the benefits of Japanese Patent Application No. 2007-179082 filed Jul. 6, 2007, the disclosure of which is herein incorporated by reference in its entirety.

BACKGROUND OF THE INVENTION

1. Field of the Invention

The present invention relates in general to a vehicular power transmitting system, and more particularly to an improvement of the system for reducing its size.

2. Discussion of Prior Art

There is known a vehicular power transmitting system including (a) a transmission portion constituting a part of a power transmitting path, and (b) an electrically controlled differential portion connected to the electric motor, and having a differential state between rotating speeds of its input and output shafts, which differential state is controllable according to a change of an operating speed of the electric motor. There have been proposed some techniques for reducing the size of such a vehicular power transmitting system. JP-2006-94680 A discloses an example of this vehicular power transmitting system, wherein a stator of the electric motor is mounted on a casing via a spacer, and a rotating shaft of a rotary device of the electric motor is supported rotatably by a support wall fixed to the casing. The spacer and the support wall are formed integrally, so that the spacer can be fixed to the casing by fixing the support wall to the casing. Thus, the vehicular power transmitting system does not require a structure for fixing the spacer to the casing, separately from the support wall, whereby the system can be made small-sized.

Although the prior art techniques described above permit some degree of reduction of the size of the vehicular power transmitting system, the size reduction is limited. In particular, the prior art techniques suffer from difficulty to effectively reduce the overall length of the power transmitting system, namely, its dimension in the axial direction of the input and output shafts. In this respect, there has been a need of developing a vehicular power transmitting system which is constructed to minimize its overall length.

SUMMARY OF THE INVENTION

The present invention was made in view of the background art described above. It is therefore an object of this invention to provide a vehicular power transmitting system constructed to minimize its overall length.

The object indicated above can be achieved according to any one of the following modes of this invention, each of which is numbered like the appended claims and depends from the other mode or modes, wherein appropriate, for easier understanding of technical features disclosed in this application, and possible combinations of those features.

(1) A vehicular power transmitting system comprising:

a transmission portion constituting a part of a power transmitting path and including frictional coupling devices;

an electric motor connected to the power transmitting path and including a rotor, and a stator having a winding portion;

an electrically controlled differential portion connected to the electric motor, and having a differential state between rotating speeds of its input and output shafts, which differential state is controllable according to a change of an operating speed of the electric motor;

a casing accommodating the transmission portion, the electric motor and the electrically controlled differential portion; and a support member for supporting the rotor of the electric motor, the support member including a support portion formed in one axial end portion thereof, at which the rotor is supported rotatably about its axis, and a tapered portion having a diameter which increases in an axial direction from the above-indicated one axial end portion toward the other axial end portion at which the support member is fixed to the casing, and wherein the winding portion of the stator of the electric motor is disposed in a space formed radially outwardly of the tapered portion, while a fluid passage portion for supplying a working fluid to the frictional coupling device of the transmission portion is disposed in a space formed radially inwardly of the tapered portion.

In the vehicular power transmitting system constructed according to the above-described mode (1) which is a first aspect of this invention, the support member for supporting the rotor of the electric motor includes the support portion formed in its one axial end portion, at which the rotor is supported rotatably about its axis, and the tapered portion having the diameter increasing in the axial direction from the above-indicated one axial end portion to the other axial end portion at which the support member is fixed to the casing. The winding portion of the stator of the electric motor is disposed in the space formed radially outwardly of the tapered portion, while the fluid passage portion for supplying the working fluid to the frictional coupling devices of the transmission portion is disposed in the space formed radially inwardly of the tapered portion. The provision of the support member including the tapered portion permits reduction of the axial dimension of the vehicular power transmitting system as compared with that of the prior art vehicular power transmitting system in which the support member does not include a tapered portion. Thus, the present mode (1) of the invention provides a vehicular power transmitting system the overall axial dimension of which can be effectively minimized.

(2) The vehicular power transmitting system according to the above-described mode (1), wherein the tapered portion has fluid passages formed therethrough so as to extend from the above-indicated other axial end portion toward a radially inner part of the support member, each of the fluid passages having a circular shape in transverse cross section, and an open end having an elliptical shape in cross section taken in a plane inclined with respect to a direction of extension of the fluid passage, each fluid passage being held in communication at the open end with a fluid passage formed in the casing.

In the vehicular power transmitting system according to the above-described mode (2), the axial dimension can be made smaller than in the prior art vehicular power transmitting system wherein the support member does not include a tapered portion.

(3) The vehicular power transmitting system according to the above-described mode (1) or (2), wherein the frictional coupling devices of the transmission portion include a clutch and a brake which are disposed adjacent to each other in an axial direction of the transmission portion, and further includes a holder member which holds a hub of the clutch and a hub of the brake such that the hubs of the clutch and brake are disposed on respective axially opposite sides of the holder member.

In the vehicular power transmitting system according to the above-described mode (3), the axial dimension can be made smaller than in the prior art vehicular power transmitting system wherein the support member does not include a tapered portion.

(4) The vehicular power transmitting system according to any one of the above-described modes (1)-(3), wherein the support member further includes a plurality of fluid passages formed through said tapered portion so as to extend from said other axial end portion toward a radially inner part of the support member, and an inner cylindrical portion extending from the above-indicated one axial end portion in an axial direction of the support member into the space formed radially inwardly of the tapered portion, the inner cylindrical portion having the plurality of fluid passages open in an outer circumferential surface thereof and having respective open ends that are spaced apart from each other in an axial direction of the inner cylindrical portion.

In the vehicular power transmitting system according to the above-described mode (4), the open ends of the fluid passages formed through the inner cylindrical portion are located in a radially inner part of the power transmitting system 10, whereby the system 10 can be effectively small-sized.

(5) The vehicular power transmitting system according to any one of the above-described modes (1)-(4), further comprising a hydraulic control unit which is provided to generate a hydraulic pressure for controlling an operation of the vehicular power transmitting system and which is formed integrally with the casing.

According to the above-described mode (5), the overall axial dimension of the power transmitting system provided with the hydraulic control unit can be effectively minimized.

(6) The vehicular power transmitting system according to any one of the above-described modes (1)-(5), wherein the transmission portion is a step-variable transmission having a plurality of gear positions which are selectively established.

According to the above-described mode (6), the overall axial dimension of the power transmitting system provided with the step-variable transmission can be effectively minimized.

(7) The vehicular power transmitting system according to any one of the above-described modes (1)-(7), wherein the electrically controlled differential portion includes a planetary gear set having rotary elements, and at least one electric motor fixed to at least one of the rotary elements of the planetary gear set.

According to the above-described mode (7), the overall axial dimension of the power transmitting system provided with the differential portion including the planetary gear set and the electric motor(s) can be effectively minimized (8) The vehicular power transmitting system according to any one of the above-described modes (1)-(7), wherein the electrically controlled differential portion functions as a continuously-variable transmission according to a change of the operating speed of the electric motor.

According to the above-described mode (8), the overall axial dimension of the power transmitting system provided with the electrically controlled differential portion operable as the continuously-variable transmission can be effectively minimized/.

(9) A vehicular power transmitting system comprising:
a transmission portion constituting a part of a power transmitting path;
an electric motor connected to the power transmitting path and including a rotor;
an electrically controlled differential portion connected to the electric motor, and having a differential state between rotating speeds of its input and output shafts, which differential state is controllable according to a change of an operating speed of the electric motor;
a casing accommodating the transmission portion, the electric motor and the electrically controlled differential portion: and
a support member for supporting the rotor of the electric motor, the support member including a support portion formed in one axial end portion thereof, at which the rotor is supported rotatably about its axis, and a tapered portion having a diameter which increases in an axial direction from the above-indicated one axial end portion toward the other axial end portion at which the support member is fixed to the casing,
and wherein the support member has fluid passages formed through the tapered portion so as to extend from the above-indicated other axial end portion toward a radially inner part of the support member, each of the fluid passages having a circular shape in transverse cross section taken in a plane perpendicular to a direction of its extension,
each of the fluid passages having an open end which corresponds to the other axial end portion and which has an elliptical shape in cross section taken in a plane inclined with respect to the direction of extension of the fluid passage, the fluid passage communicating at the open end with a fluid passage formed through the casing.

In the vehicular power transmitting system constructed according to the above-described mode (9) which is a second aspect of this invention, the support member for supporting the rotor of the electric motor includes the support portion formed in its one axial end portion, at which the rotor is supported rotatably about its axis, and the tapered portion having the diameter increasing in the axial direction from the above-indicated one axial end portion to the other axial end portion at which the support member is fixed to the casing. The support member has fluid passages formed through the tapered portion so as to extend from the above-indicated other axial end portion toward the radially inner part of the support member. Each of the fluid passages, which has the circular shape in transverse cross section, has the open end which corresponds to the above-indicated other axial end portion and which has the elliptical shape in cross section taken in the plane inclined with respect to the direction of extension of the fluid passage, and communicates at the open end with the fluid passage formed through the casing. The provision of the support member including the tapered portion permits reduction of the axial dimension of the vehicular power transmitting system as compared with that of the prior art vehicular power transmitting system in which the support member does not include a tapered portion. Thus, the present mode (9) of the invention provides a vehicular power transmitting system the overall axial dimension of which can be effectively minimized.

(10) The vehicular power transmitting system according to the above-described mode (9), wherein the support member further includes an inner cylindrical portion extending from the above-indicated one axial end portion in an axial direction of the support member into the space formed radially inwardly of the tapered portion, the inner cylindrical portion having a plurality of fluid passages open in an outer circumferential surface thereof and having respective open ends that are spaced apart from each other in an axial direction of the inner cylindrical portion.

The vehicular power transmitting system according to the above-described mode (10) has the same advantage as described above with respect to the above-described mode (4).

(11) The vehicular power transmitting system according to the above-described mode (9) or (10), further comprising a hydraulic control unit which is provided to generate a hydraulic pressure for controlling an operation of the vehicular power transmitting system and which is formed integrally with the casing.

The vehicular power transmitting system according to the above-described mode (11) has the same advantage as described above with respect to the above-described mode (5).

(12) The vehicular power transmitting system according to any one of the above-described modes (9)-(11), wherein the transmission portion is a step-variable transmission having a plurality of gear positions which are selectively established.

The vehicular power transmitting system according to the above-described mode (12) has the same advantage as described above with respect to the above-described mode (6).

(13) The vehicular power transmitting system according to any one of the above-described modes (9)-(12), wherein the electrically controlled differential portion includes a planetary gear set having rotary elements, and at least one electric motor fixed to at least one of the rotary elements of the planetary gear set.

The vehicular power transmitting system according to the above-described mode (13) has the same advantage as described above with respect to the above-described mode (7).

(14) The vehicular power transmitting system according to any one of the above-described modes (9)-(13), wherein the electrically controlled differential portion functions as a continuously-variable transmission according to a change of the operating speed of the electric motor.

The vehicular power transmitting system according to the above-described mode (14) has the same advantage as described above with respect to the above-described mode (8).

(15) A vehicular power transmitting system comprising:

a transmission portion constituting a part of a power transmitting path and including a clutch and a brake that are disposed adjacent to each other in an axial direction thereof;

an electric motor connected to the power transmitting path and including a rotor;

an electrically controlled differential portion connected to the electric motor, and having a differential state between rotating speeds of its input and output shafts, which differential state is controllable according to a change of an operating speed of the electric motor;

a casing accommodating the transmission portion, the electric motor and the electrically controlled differential portion;

a support member for supporting the rotor of the electric motor, the support member including a support portion formed in one axial end portion thereof, at which the rotor is supported rotatably about its axis, and a tapered portion having a diameter which increases in an axial direction from the above-indicated one axial end portion toward the other axial end portion at which the support member is fixed to the casing; and a holder member for holding a hub of the clutch and a hub of the brake such that the hubs of the clutch and brake are disposed on respective axially opposite sides of the holder member.

In the vehicular power transmitting system constructed according to the above-described mode (15) which is a third aspect of this invention, the support member for supporting the rotor of the electric motor includes the support portion formed in its one axial end portion, at which the rotor is supported rotatably about its axis, and the tapered portion having the diameter increasing in the axial direction from the above-indicated one axial end portion to the other axial end portion at which the support member is fixed to the casing. The holder member provided in the present power transmitting system holds the hubs of the clutch and brake of the transmission portion such that the hubs of the clutch and brake are disposed on the respective axially opposite sides of the holder member. The provision of the support member including the tapered portion permits reduction of the axial dimension of the vehicular power transmitting system as compared with that of the prior art vehicular power transmitting system in which the support member does not include a tapered portion. Thus, the present mode (9) of the invention provides a vehicular power transmitting system the overall axial dimension of which can be effectively minimized.

(16) The vehicular power transmitting system according to the above-described mode (15), wherein the transmission portion has an input rotary member, and the electric motor and the clutch are both fixed to the input rotary member.

According to the above-described mode (16), the overall axial dimension of the power transmitting system wherein the electric motor and the clutch are fixed to the electric motor can be effectively minimized.

(17) The vehicular power transmitting system according to the above-described mode (15) or (16), wherein the transmission portion is a step-variable transmission having a plurality of gear positions which are selectively established.

The vehicular power transmitting system according to the above-described mode (17) has the same advantage as described above with respect to the above-described mode (6).

(18) The vehicular power transmitting system according to any one of the above-described modes (15)-(17), wherein the electrically controlled differential portion includes a planetary gear set having rotary elements, and at least one electric motor fixed to at least one of the rotary elements of the planetary gear set.

The vehicular power transmitting system according to the above-described mode (18) has the same advantage as described above with respect to the above-described mode (7).

(19) The vehicular power transmitting system according to any one of the above-described modes (15)-(18), wherein the electrically controlled differential portion functions as a continuously-variable transmission according to a change of the operating speed of the electric motor.

The vehicular power transmitting system according to the above-described mode (19) has the same advantage as described above with respect to the above-described mode (8).

DETAILED DESCRIPTION OF PREFERRED EMBODIMENT

Figures 1, 2:
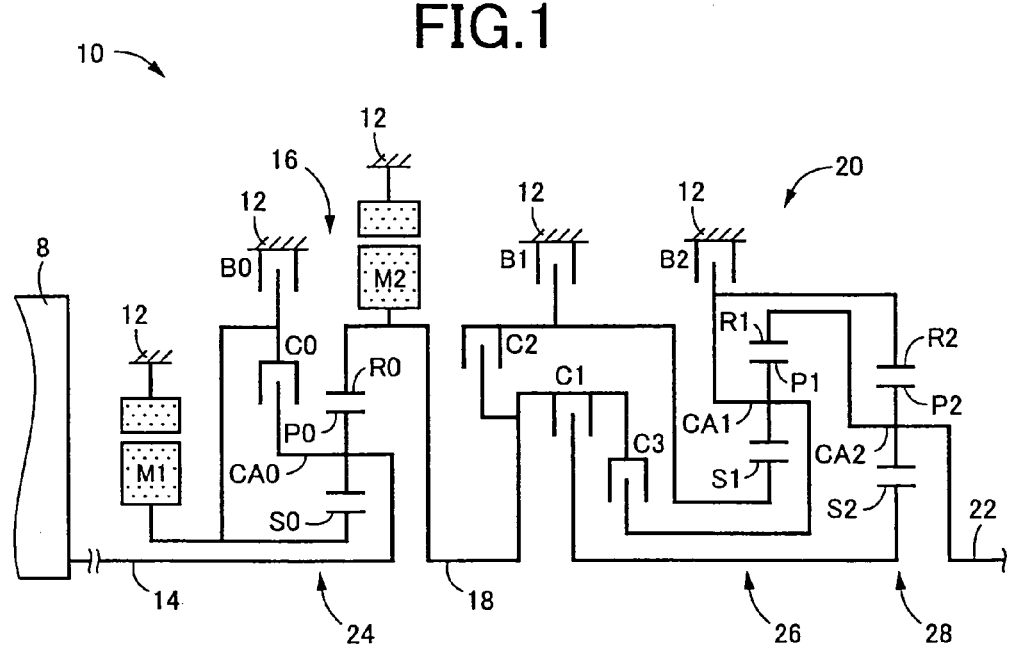
FIG. 1 is a schematic view showing an arrangement of a hybrid vehicle power transmitting system constructed according to one embodiment of the present invention.
FIG. 2 is a table indicating operating positions of the power transmitting system of FIG. 1 placed in a continuously-variable or step-variable shifting state, in relation to different combinations of operating states of hydraulically operated frictional coupling devices to establish the respective operating positions.

Referring first to the schematic view of FIG. 1, there is shown a vehicular power transmitting system 10 constructed according to one embodiment of the present invention. This power transmitting system 10 constitutes a part of a drive system for a hybrid vehicle, which drive system includes a drive power source in the form of an engine 8 that is an internal combustion engine such as a gasoline engine or a diesel engine. As shown in FIG. 1, the power transmitting system 10 includes: a stationary member in the form of a transmission casing 12 (hereinafter referred to simply as "casing 12") which is attached to a body of the hybrid vehicle and which is formed integrally with a structure of a hydraulic control unit 36 shown in FIG. 9); an input rotary member in the form of an input shaft 14 connected directly, or indirectly via a pulsation absorbing damper or vibration damping device (not shown) to the engine 8; a differential device in the form of a power distributing mechanism 16 connected to the input shaft 14; a step-variable transmission in the form of a transmission portion 20 connected in series to and disposed between the power distributing mechanism 16 and a power transmitting member (power transmitting shaft) 18; and an output rotary member in the form of an output shaft 22 connected to the transmission portion 20. The input shaft 14, power distributing mechanism 16, transmission portion 20 and output shaft 22 are coaxially disposed on a common axis in the casing 12, and are connected in series with each other. This vehicular power transmitting system 10 is suitably used for a longitudinal FR vehicle (front-engine, rear-drive vehicle), and is disposed between the drive power source in the form of the engine 8 and a pair of drive wheels (not shown), to transmit a vehicle drive force from the engine 8 to the pair of drive wheels through a differential gear device (final speed reduction gear device) and a pair of drive axles (not shown). It is noted that a lower half of the power transmitting system 10, which is constructed symmetrically with respect to its axis, is omitted in FIG. 1.

The power distributing mechanism 16 is a differential device operable to mechanically distribute an output of the engine 8 received through the input shaft 14 to a first electric motor M1 and the power transmitting member 18, and to mechanically synthesize the output of the engine 8 and an output of the first electric motor M1. As shown in FIG. 1, the power distributing system 10 further includes a second electric motor M2 which is rotated together with the power transmitting member 18. The second electric motor M2 may be disposed at any portion of a power transmitting path between the power transmitting member 18 and the output shaft 22. Each of the first and second electric motors M1 and M2 used in the power transmitting system 10 of the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a planetary gear set 24 of a single pinion type having a gear ratio $\rho 0$ of about 0.428, for example, a switching clutch C0 and a switching brake B0. The planetary gear set 24 has rotary elements consisting of: a sun gear S0, a planetary gear P0; a carrier CA0 supporting the planetary gear P0 such that the planetary gear P0 is rotatable about its axis and about the axis of the sun gear S0; and a ring gear R1 meshing with the sun gear S0 through the planetary gear P0. Where the numbers of teeth of the sun gear S0 and the ring gear R0 are represented by ZS0 and ZR0, respectively, the above-indicated gear ratio $\rho 1$ is represented by ZS0/ZR0.

In the power distributing mechanism 16, the carrier CA0 is connected to the input shaft 14, that is, to the engine 8, and the sun gear S0 is connected to the first electric motor M1, while the ring gear R0 is connected to the power transmitting member 18. The switching brake B0 is disposed between the sun gear S0 and the casing 12, and the switching clutch C0 is disposed between the sun gear S0 and the carrier CA0. When the switching clutch C0 and brake B0 are both released, the power distributing mechanism 16 is placed in a differential state in which three elements of the planetary gear set 24 consisting of the sun gear S0, carrier CA0 and ring gear R0 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 16 is placed in a continuously-variable shifting state, in which the rotating speed of the power transmitting member 18 is continuously variable, irrespective of the operating speed of the engine 8, namely, placed in a differential state in which a speed ratio γ0 (rotating speed of the input shaft 14/rotating speed of the power transmitting member 18) of the power distributing mechanism 16 is continuously changed from a minimum value γ0 min to a maximum value γ0 max. That is, the power distributing mechanism 16 is placed in the continuously-variable shifting state in which the power distributing mechanism 16 functions as an electrically controlled continuously-variable transmission the speed ratio γ0 of which is continuously variable from the minimum value γ0 min to the maximum value γ0 max Namely, the power distributing mechanism 16 is connected to the second electric motor M2, and functions as an electrically controlled differential portion a differential state between rotating speeds of input and output shafts of which is controllable according to a change of the operating speed of the second electric motor M2.

When the sun gear S0 and the carrier CA0 are connected to each other with an engaging action of the switching clutch C0 during running of the hybrid vehicle with the output of the engine 8, the power distributing mechanism 16 is placed in a locked or non-differential state in which the three rotary elements of the planetary gear set 24 consisting of the sun gear S0, carrier CA0 and ring gear R0 are rotatable as a unit, namely, placed in a first non-differential state in which the operating speed of the engine 8 and the rotating speed of the power transmitting member 18 are made equal to each other, so that the power distributing mechanism 16 is placed in a fixed-speed-ratio shifting state or step-variable shifting state in which the power distributing mechanism 16 functions as a transmission having a fixed speed ratio γ equal to 1. When the switching brake B0 is engaged in place of the switching clutch C0, the sun gear S0 is fixed to the casing 12, so that the power distributing mechanism 16 is placed in a locked or non-differential state in which the sun gear S0 is not rotatable, namely, placed in a second non-differential state in which the rotating speed of the ring gear R0 is made higher than that of the carrier CA0, so that the power distributing mechanism 16 is placed in a fixed-speed-ratio shifting state or step-variable shifting state in which the power distributing mechanism 16 functions as a speed-increasing transmission having a fixed speed ratio γ0 smaller than 1, for example, about 0.7.

The transmission portion 20 is a mechanical transmission device operable to change a speed of a rotary motion received through an input rotary member in the form of the power transmitting member 18, and transmit the rotary motion of the changed speed to an output member in the form of the output shaft 22. The transmission portion 20 includes a single-pinion type first planetary gear set 26 and a single-pinion type second planetary gear set 28. The first planetary gear set 26 has: a first sun gear S1; a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. For example, the first planetary gear set 26 has a gear ratio ρ1 of about 0.500. The second planetary gear set 28 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 28 has a gear ratio ρ2 of about 0.308. Where the numbers of teeth of the first sun gear S1, first ring gear R1, second sun gear S2 and second ring gear R2 are represented by ZS1, ZR1, ZS2 and ZR2, respectively, the above-indicated gear ratios ρ1 and ρ2 are represented by ZS1/ZR1 and ZS2/ZR2, respectively.

In the transmission portion 20, the first sun gear S1 is selectively connected to the power transmitting member 18 through a second clutch C2, and is selectively fixed to the stationary member in the form of the casing 12 through a first brake B1. Further, the first carrier CA1 and the second ring gear R2 which are integrally fixed to each other as a unit are selectively connected to the power transmitting member 18 through a third clutch C3, and are selectively fixed to the casing 12 through a second brake B2. The first ring gear R1 and the second carrier CA2 which are integrally fixed to each other as a unit are fixed to the output shaft 22. Further, the second sun gear S2 is selectively connected to the power transmitting member 18 through a first clutch C1.

The above-described switching clutch C0, first clutch C1, second clutch C2 and third clutch C3 (hereinafter collectively referred to as "clutches", unless otherwise specified), and the switching brake B0, first brake B1 and second brake B2 (hereinafter collectively referred to as "brakes", unless otherwise specified) are hydraulically operated frictional coupling devices well known in the art. Each of these frictional coupling devices is preferably constituted by a wet-type multiple-disc clutch including a plurality of friction plates which are forced against each other by a hydraulic actuator, and each brake is preferably constituted by a band brake including a rotary drum and one band or two bands which is/are wound on the outer circumferential surface of the rotary drum and tightened at one end by a hydraulic actuator. Each of the clutches and brakes is selectively engaged for connecting two members between which each clutch or brake is interposed.

In the power transmitting system 10 constructed as described above, a first gear position (first speed position) through a seventh gear position (seventh speed position), a reverse gear position (rear drive position) and a neural position is selectively established by engaging actions of a corresponding combination of the frictional coupling devices selected from the above-described switching clutch C0, first clutch C1, second clutch C2, third clutch C3, switching brake B0, first brake B1 and second brake B2, as indicated in the table of FIG. 2. The seven gear positions, which are forward drive positions, have respective speed ratios γ (speed $N_{IN}$ of the input shaft 14/speed $N_{OUT}$ of the output shaft 22) which change as geometric series. When the switching clutch C0 and brake B0 provided in the power distributing mechanism 16 are both released, the power distributing mechanism 16 is placed in the continuously-variable shifting state in which the power distributing mechanism 16 is operable as the continuously-variable transmission. When one of the switching clutch C0 and brake B0 is engaged, the power distributing mechanism 16 is placed in the fixed-speed-ratio shifting state in which the power distributing mechanism 16 is operable as the transmission having a single gear position of a fixed speed ratio or a plurality of gear positions having respective fixed speed ratios. Accordingly, the step-variable transmission is constituted by the transmission portion 20 and the power distributing mechanism 16 placed in the fixed-speed-ratio shifting state with one of the switching clutch C0 and brake B0 being placed in the engaged state, while the continuously-variable transmission is constituted by the transmission portion 20 and the power distributing mechanism 16 placed in the continuously-variable shifting state with both of the switching clutch C0 and brake B0 being placed in the released state.

When the power transmitting system 10 functions as the step-variable transmission, the first gear position having the highest speed ratio γ1 of about 4.250, for example, is established by engaging actions of the switching clutch C0, first clutch C1 and second brake B2, and the second gear position having a speed ratio γ2 of about 2.976, for example, which is lower than the speed ratio γ1, is established by engaging actions of the switching clutch B0, first clutch C1 and second brake B2, as indicated in FIG. 2. Further, the third gear position having a speed ratio γ3 of about 2.083, for example, which is lower than the speed ratio γ2, is established by engaging actions of the switching clutch C0, first clutch C1 and first brake B1, and the fourth gear position having a speed ratio γ4 of about 1.459, for example, which is lower than the speed ratio γ3, is established by engaging actions of the switching brake B0, first clutch C1 and first brake B1. The fifth gear position having a speed ratio γ5 of about 1.000, for example, which is smaller than the speed ratio γ4, is established by engaging actions of the switching clutch C0, first clutch C1 and third clutch C3. Further, the sixth gear position having a speed ratio γ6 of about 0.667, for example, which is smaller than the speed ratio γ5, is established by engaging actions of the switching clutch C0, third clutch C3 and first brake B1, and the seventh gear position having a speed ratio γ7 of about 0.467, for example, which is smaller than the speed ratio γ6, is established by engaging actions of the switching brake B0, third clutch C3 and first brake B1. The reverse gear position having a speed ratio γR of about 2.000, for example, which is intermediate between the speed ratios γ3 and γ4, is established by engaging actions of the second clutch C2 and the second brake B2 when the reverse drive of the vehicle is effected by using the engine 8 as the drive-power source, and by engaging actions of the first clutch C1 and the second brake B2 when the reverse drive is effected by using the second electric motor M2 as the drive power source. The neutral position N is established by engaging only the second brake B2.

It is noted that the speed ratios of the adjacent two gear positions of the power transmitting system 10 functioning as the step-variable transmission change as geometric series that is ideal for step-variable shifting of the step-variable transmission. That is, a stepping ratio between the adjacent gear positions is substantially constant. Described more specifically, the stepping ratio (γ1/γ2) between the first and second gear positions is 1.428, and the stepping ratio (γ2/γ3) between the second and third gear positions is 1.429, while the stepping ratio (γ3/γ4) between the third and fourth gear positions is 1.428. The stepping ratio (γ4/γ5) between the fourth and fifth is 1.459, and the stepping ratio (γ5/γ6) between the fifth and sixth gear positions is 1.499, while the stepping ratio (γ6/γ7) between the sixth and seventh gear positions is 1.428. The overall speed ratio (γ5/γ6) between the first and seventh gear positions, that is, a spread of the speed ratios of the seven gear positions is as high or wide as 9.104.

Where the power transmitting system 10 functions as the continuously-variable transmission, on the other hand, the switching clutch C0 and the switching brake B0 are both released, so that the power distributing mechanism 16 functions as the continuously variable transmission, while the transmission portion 20 connected in series to the power distributing mechanism 16 functions as the step-variable transmission having the four forward drive gear positions, whereby the speed of the rotary motion transmitted to the transmission portion 20 automatically shifted to a selected one of the four forward drive gear positions (first, third, fifth and sixth gear positions indicated in the table of FIG. 2), namely, the rotating speed of the power transmitting member 18 is continuously changed, so that the speed ratio of the power transmitting system 10 when the transmission portion 20 is placed in the selected one of the four gear positions is continuously variable over a predetermined range. Accordingly, the overall speed ratio γT of the power transmitting system 10 is continuously variable, even while the speed ratio of the transmission portion 20 is changed in steps.

Figure 3:
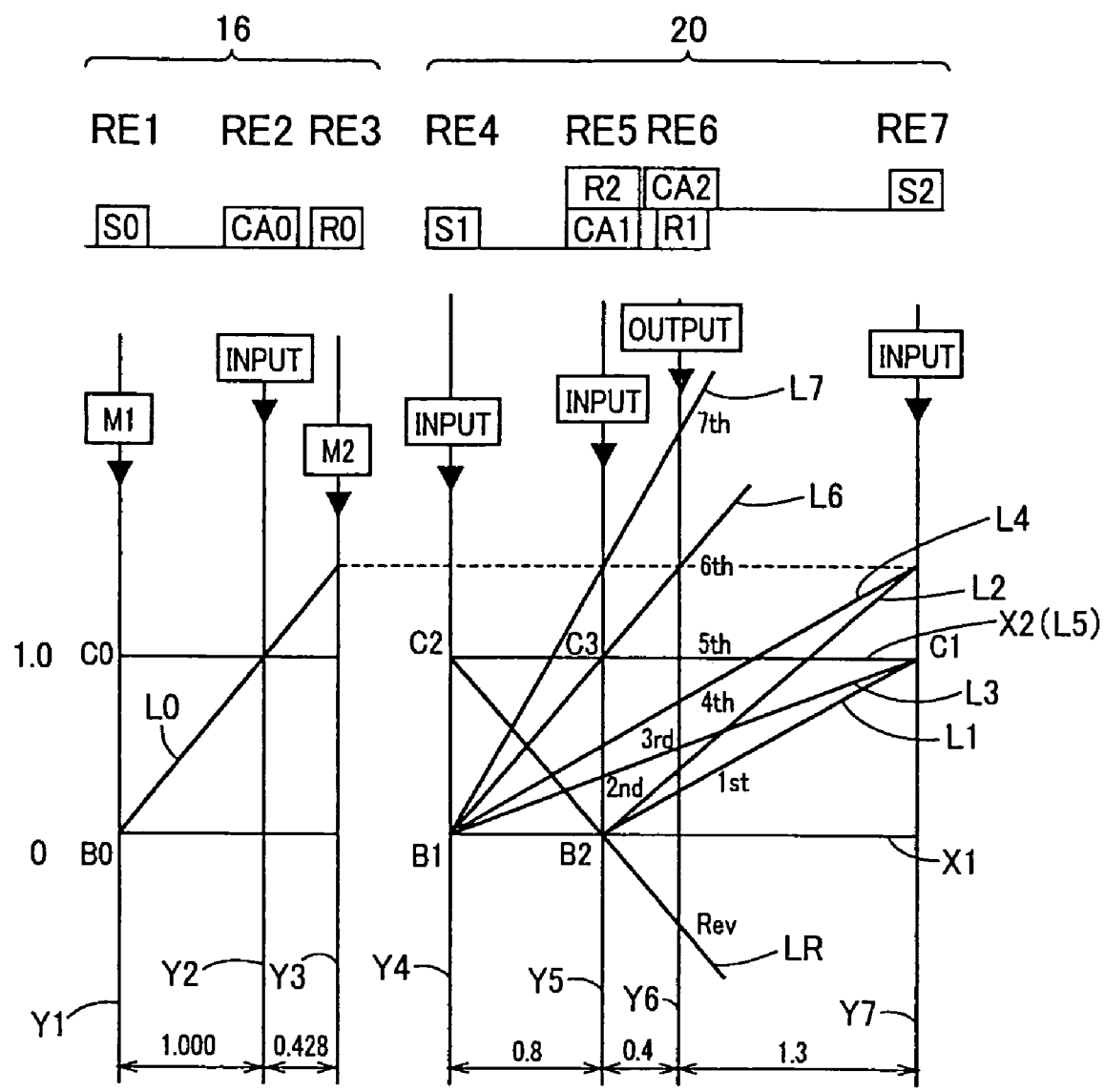
FIG. 3 is a collinear chart indicating relative rotating speeds of the power transmitting system of FIG. 1 placed in the step-variable shifting state, in different gear positions of the system.

The collinear chart of FIG. 3 indicates, by straight lines, a relationship among the rotating speeds of the rotary elements in each of the gear positions of the power transmitting system 10, which is constituted by the power distributing mechanism 16 and the transmission portion 20. The collinear chart of FIG. 3 is a rectangular two-dimensional coordinate system in which the gear ratios ρ of the planetary gear sets 24, 26, 28 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. Further, three vertical lines Y1, Y2 and Y3 corresponding to the power distributing mechanism 16 respectively represent the relative rotating speeds of a first second rotary element RE1 in the form of the sun gear S0, a second rotary element RE2 in the form of the carrier CA0, and a third rotary element RE3 in the form of the ring gear R0. The distances between the adjacent ones of the vertical lines Y1, Y2 and Y3 are determined by the gear ratio ρ0 of the planetary gear set 24. Further, four vertical lines Y4, Y5, Y6 and Y7 corresponding to the transmission portion 20 respectively represent the relative rotating speeds of a fourth rotary element RE4 in the form of the first sun gear S1, a fifth rotary element RE5 in the form of the first carrier CA1 and the second ring gear R2 integrally fixed to each other, a sixth rotary element RE6 in the form of the first ring gear R1 and the second carrier CA2 integrally fixed to each other, and a seventh rotary element RE7 in the form of the second sun gear S2. The distances between the adjacent ones of the vertical lines are determined by the gear ratios ρ1 and ρ2 of the first and second planetary gear sets 26, 28. That is, the distance between the vertical lines Y2 and Y3 corresponds to the gear ratio ρ0. In the transmission portion 20, the distances between the vertical lines corresponding to the sun gear and carrier of each of the first and second planetary gear sets 26, 28 corresponds to "1", while the distances between the vertical lines corresponding to the carrier and ring gear of the planetary gear set 26, 28 corresponds to the gear ratio ρ.

Referring to the collinear chart of FIG. 3, the power distributing mechanism 16 of the power transmitting system 10 is arranged such that the second rotary element RE2 (carrier CA0) of the planetary gear set 24 is integrally fixed to the input shaft 14 and selectively connected to the first rotary element RE1 (sun gear S0) through the switching clutch C0, and this first rotary element R22 is fixed to the first electric motor M1 and selectively fixed to the casing 12 through the switching brake B0, while the third rotary element RE3 (ring gear R0) is fixed to the power transmitting member 18 and the second electric motor M2, so that a rotary motion of the input shaft 14 is transmitted (input) to the transmission portion 20 through the power transmitting member 18. A relationship between the rotating speeds of the sun gear S0 and the ring gear R0 is represented by an inclined straight line L0 which passes a point of intersection between the lines Y2 and X2.

The three vertical lines Y1, Y2 and Y3 corresponding to the power distributing mechanism 16 indicated on the left side of the collinear chart of FIG. 3 indicate the fixed-speed-ratio shifting state which is established by the engaging action of the switching brake B0 and in which the power distributing mechanism 16 functions as the speed-increasing transmission. In this fixed-speed-ratio shifting state, the first sun gear S0 is held stationary in the engaged state of the switching brake B0, so that a straight line L0 is inclined as indicated in FIG. 3. The rotating speed of the ring gear R0, that is, the rotating speed of the power transmitting member 18, which is represented by a point of intersection between the inclined straight line L0 and the vertical line Y3 and input to the transmission portion 20, is higher than the engine speed $N_E$.

Figure 4:
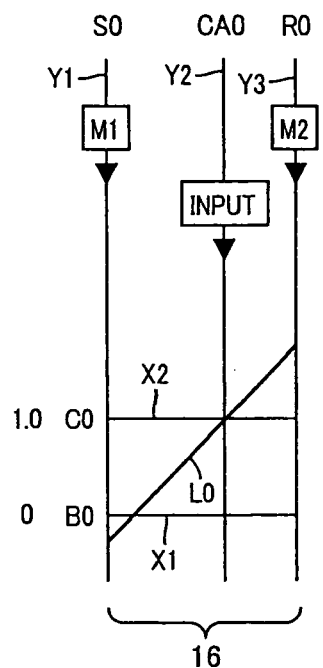
FIG. 4 is a view showing an example of an operating state of a power distributing mechanism of the power transmitting system placed in the continuously-variable shifting state, the view corresponding to a part of the collinear chart of FIG. 3 which shows the power distributing mechanism.

FIG. 4, which corresponds to a part of the collinear chart of FIG. 3 that shows the power distributing mechanism 16, indicates the operating state of the power distributing mechanism 16 placed in the continuously-variable shifting state with the switching clutch C0 and the switching brake B0 held in the released state. The rotating speed of the sun gear S0 represented by a point of intersection between the straight line L0 and the vertical line Y1 is continuously raised or lowered by controlling the reaction force generated by an operation of the first electric motor M1 as the electric generator, so that the rotating speed of the ring gear R0 represented by the point of intersection between the straight line L0 and the vertical line Y3 is continuously lowered or raised. The rotary motion the speed of which is continuously changed as described above is transmitted to the transmission portion 20.

Figure 5:
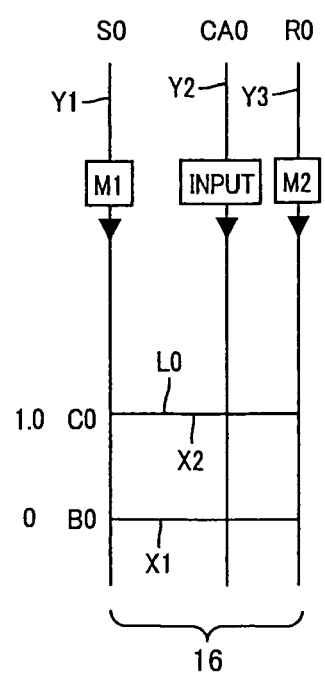
FIG. 5 is a view showing the operating state of the power distributing mechanism placed in the sep-variable shifting state by an engaging action of a switching clutch, the view corresponding to the part of the collinear chart of FIG. 3 which shows the power distributing mechanism.

FIG. 5, which also corresponds to the part of the collinear chart of FIG. 3 that shows the automatic transmission, indicates the operating state of the power distributing mechanism 16 placed in the fixed-seed-ratio shifting state with the switching clutch C0 placed in the engaged state, wherein the speed ratio is equal to "1". When the sun gear S0 and the carrier CA0 are connected to each other by the engaging action of the switching clutch C0, the three rotary elements indicated above are rotated as a unit, so that the straight line L0 is aligned with the horizontal line X2, whereby the power transmitting member 18 is rotated at a speed equal to the engine speed $N_E$. Thus, the rotary motion the speed of which is equal to the engine speed $N_E$ is transmitted to the transmission portion 20.

In the transmission portion 20, the fourth rotary element RE4 (first sun gear S1) is selectively connected to the power transmitting member 18 through the second clutch C2, and selectively fixed to the casing 12 through the first brake B1, and the fifth rotary element RE5 (first carrier CA1 and first ring gear R1) is selectively fixed to the casing 12 through the second brake B2, while the sixth rotary element RE6 (first ring gear R1 and second carrier CA2) is fixed to the output shaft 22. The seventh rotary element RE7 (second sun gear S2) is selectively connected to the power transmitting member 18 through the first clutch C1.

When the first clutch C1 and the second brake B2 are engaged in the engaged state of the switching clutch C0, the transmission portion 20 is placed in the first gear position. The rotating speed of the output shaft 22 in the first gear position is represented by a point of intersection between the vertical line Y7 indicative of the rotating speed of the sixth rotary element RE6 fixed to the output shaft 22 and an inclined straight line L1 which passes a point of intersection between the vertical line Y7 indicative of the rotating speed of the seventh rotary element RE7 and the horizontal line X2, and a point of intersection between the vertical line Y5 indicative of the rotating speed of the fifth rotary element RE5 and the horizontal line X1, as indicated in FIG. 3. Similarly, the rotating speed of the output shaft 22 in the second gear position established by the engaging actions of the first clutch C1 and second brake B2 in the engaged state of the switching brake B0 is represented by a point of intersection between an inclined straight line L2 determined by those engaging actions and the vertical line Y6 indicative of the rotating speed of the sixth rotary element RE6 fixed to the output shaft 22. The rotating speed of the output shaft 22 in the third gear position established by the engaging actions of the first clutch C1 and first brake B1 in the engaged state of the switching clutch C0 is represented by a point of intersection between an inclined straight line L3 determined by those engaging actions and the vertical line Y6 indicative of the rotating speed of the sixth rotary element RE6 fixed to the output shaft 22. The rotating speed of the output shaft 22 in the fourth gear position established by the engaging actions of the first clutch C1 and first brake B1 in the engaged state of the switching brake B0 is represented by a point of intersection between a straight line L4 determined by those engaging actions and the vertical line Y6 indicative of the rotating speed of the sixth rotary element RE6 fixed to the output shaft 22. The rotating speed of the output shaft 22 in the fifth gear position established by the engaging actions of the first clutch C1 and third clutch C3 in the engaged state of the switching clutch C0 is represented by a point of intersection between a horizontal line L5 (horizontal line X2) and the vertical line Y6 indicative of the rotating speed of the sixth rotary element RE6 fixed to the output shaft 22. The rotating speed of the output shaft 22 in the sixth gear position established by the engaging actions of the third clutch C3 and first brake B1 in the engaging state of the switching clutch C0 is represented by a point of intersection between the vertical line Y6 determined by those engaging actions and the vertical line Y6 indicative of the rotating speed of the sixth rotary element RE6 fixed to the output shaft 22. The rotating speed of the output shaft 22 in the seventh gear position established by the engaging actions of the third clutch C3 and first brake B1 in the engaged state of the switching brake B0 is represented by a point of intersection between an inclined line L7 determined by those engaging actions and the vertical line Y6 indicative of the rotating speed of the sixth rotary element RE6 fixed to the output shaft 22.

Figure 6:
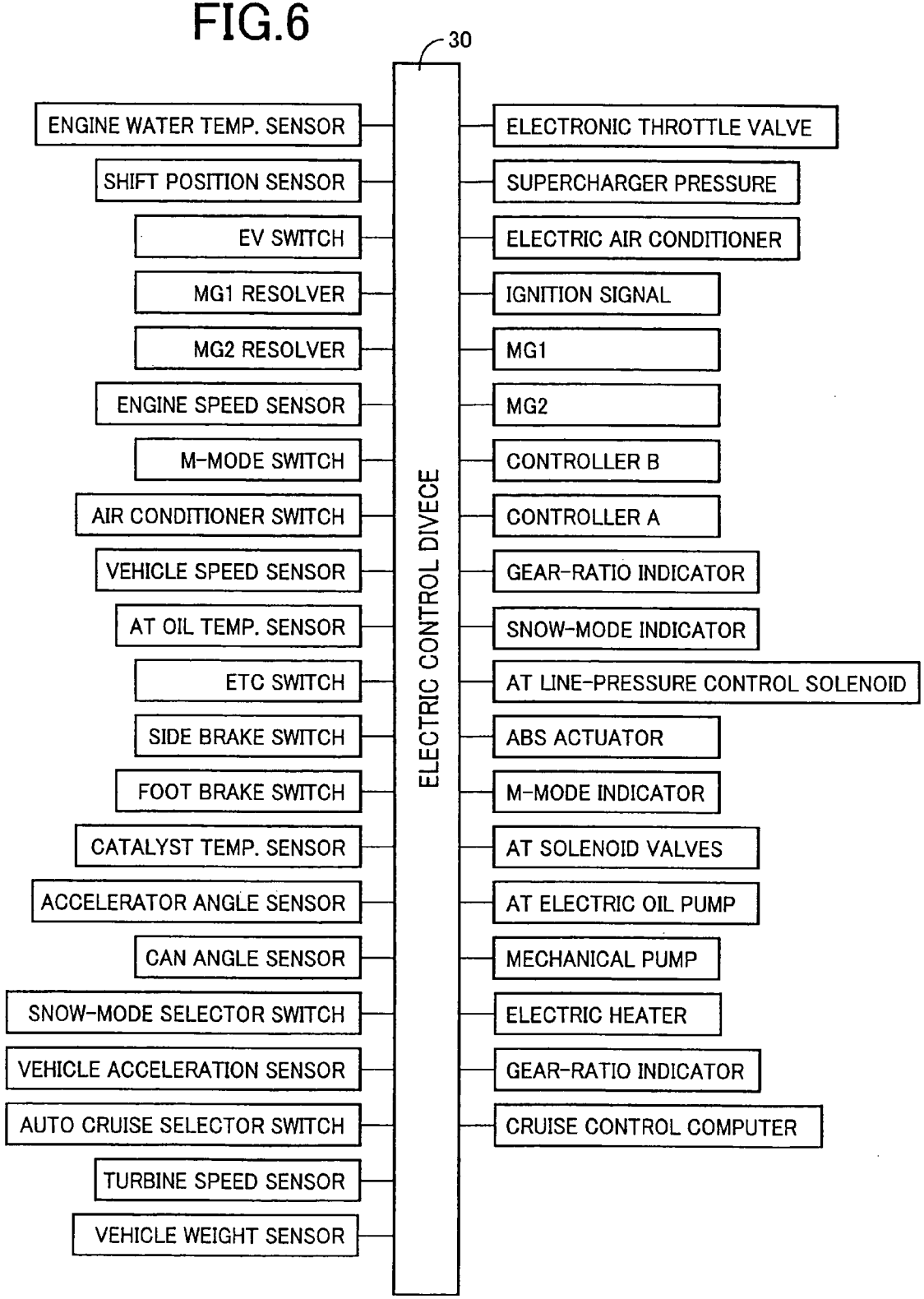
FIG. 6 is a view indicating input and output signals of a control apparatus in the form of an electronic control device provided to control the power transmitting system of FIG. 1.

FIG. 6 illustrates signals received by an electronic control device 30 provided to control the power transmitting system 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the transmission portion 20.

Figure 8:
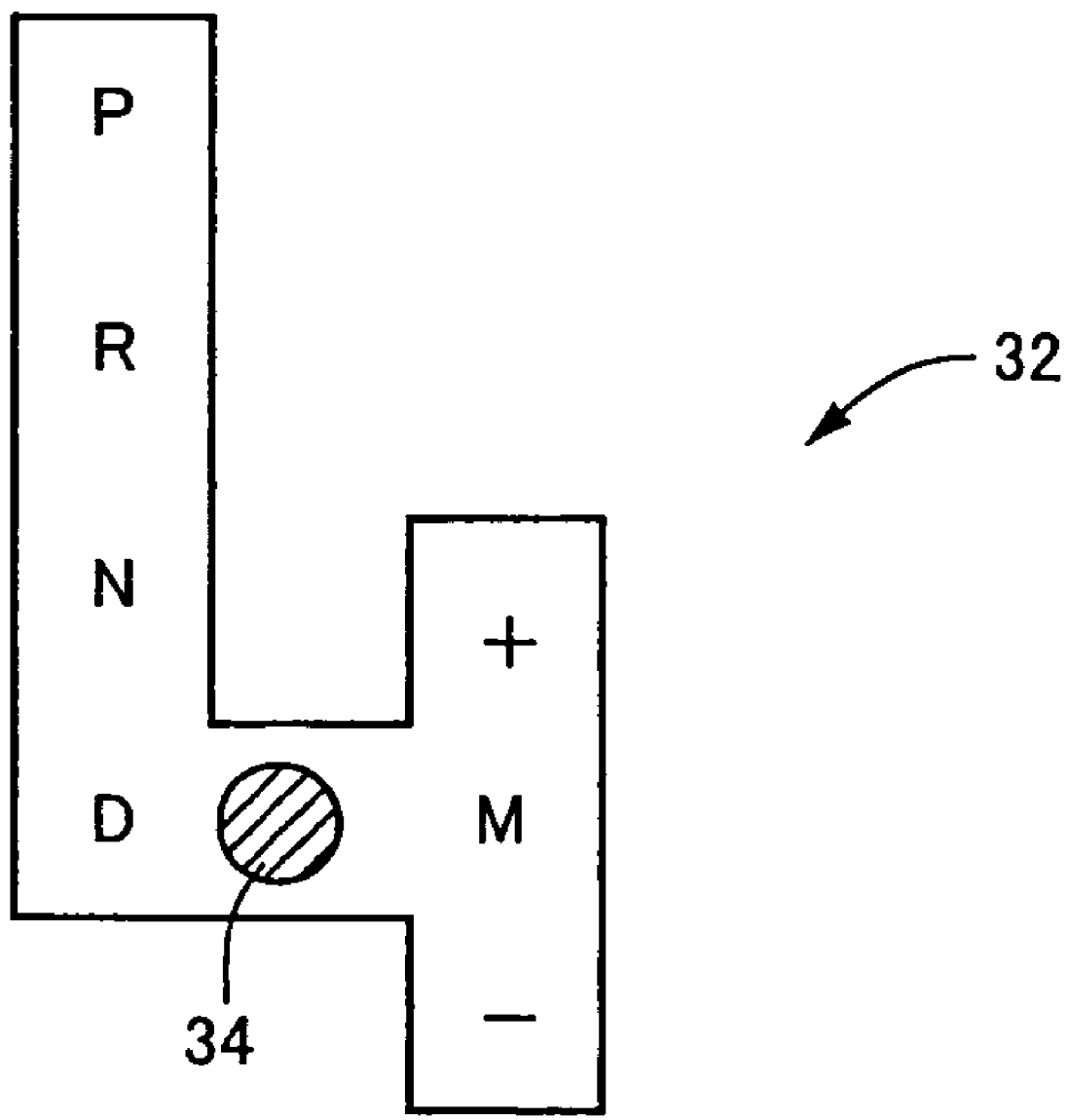
FIG. 8 is a view showing an example of a manually operated shifting device including a shift lever and operable to select one of a plurality of shift positions.

The electronic control device 30 is arranged to receive various sensors and switches shown in FIG. 6, various signals such as: a signal indicative of a temperature of cooling water of the engine 8; a signal indicative of a selected operating position of a shift lever 34 of a manually operable shifting device 32 (shown in FIG. 8); a signal indicative of the operating speed $N_E$ of the engine 8; a signal indicative of a value indicating a selected group of forward-drive positions of the power transmitting system 10; a signal indicative of an M mode (motor drive mode); a signal indicative of an operated state of an air conditioner; a signal indicative of a vehicle speed V corresponding to the rotating speed $N_{OUT}$ of the output shaft 22; a signal indicative of a temperature of a working oil or fluid of the transmission portion 20; a signal indicative of an operated state of a side brake; a signal indicative of an operated state of a foot brake; a signal indicative of a temperature of a catalyst; a signal indicative of an amount of operation (an angle of operation) of a manually operable vehicle accelerating member in the form of an accelerator pedal (not shown); a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the power distributing mechanism 16 in the step-variable shifting state (fixed-speed-ration shifting state) in which the power transmitting system 10 functions as the step-variable transmission; a signal indicative of a continuously-variable shifting switch provided to place the power distributing mechanism 16 in the continuously variable-shifting state (differential state) in which the power distributing system 10 functions as the continuously variable transmission; a signal indicative of a rotating speed $N_{M1}$ of the first electric motor M1; and a signal indicative of a rotating speed $N_{M2}$ of the second electric motor M2.

The electronic control device 30 is further arranged to generate various signals such as: a drive signal to drive a throttle actuator (not shown) for controlling an angle of opening of an electronic throttle valve (not shown) of the engine 8; a signal to adjust a supercharger pressure of the engine 8; a signal to operate the electric air conditioner; a signal to be applied to an ignition device to control the ignition timing of the engine 8; signals to operate the electric motors M1 and M2; a signal to operate a shift-range indicator for indicating the selected position of the shift lever 34; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M mode (motor drive mode); signals to operate solenoid-operated valves incorporated in a hydraulic control unit 36 (shown in FIG. 9) provided to control the hydraulic actuators of the hydraulically operated frictional coupling devices of the power distributing mechanism 16 and transmission portion 20; a signal to operate an electric oil pump used as a hydraulic pressure source for the hydraulic control unit 36; a signal to drive an electric heater; and a signal to be applied to a cruise-control computer.

Figure 7:
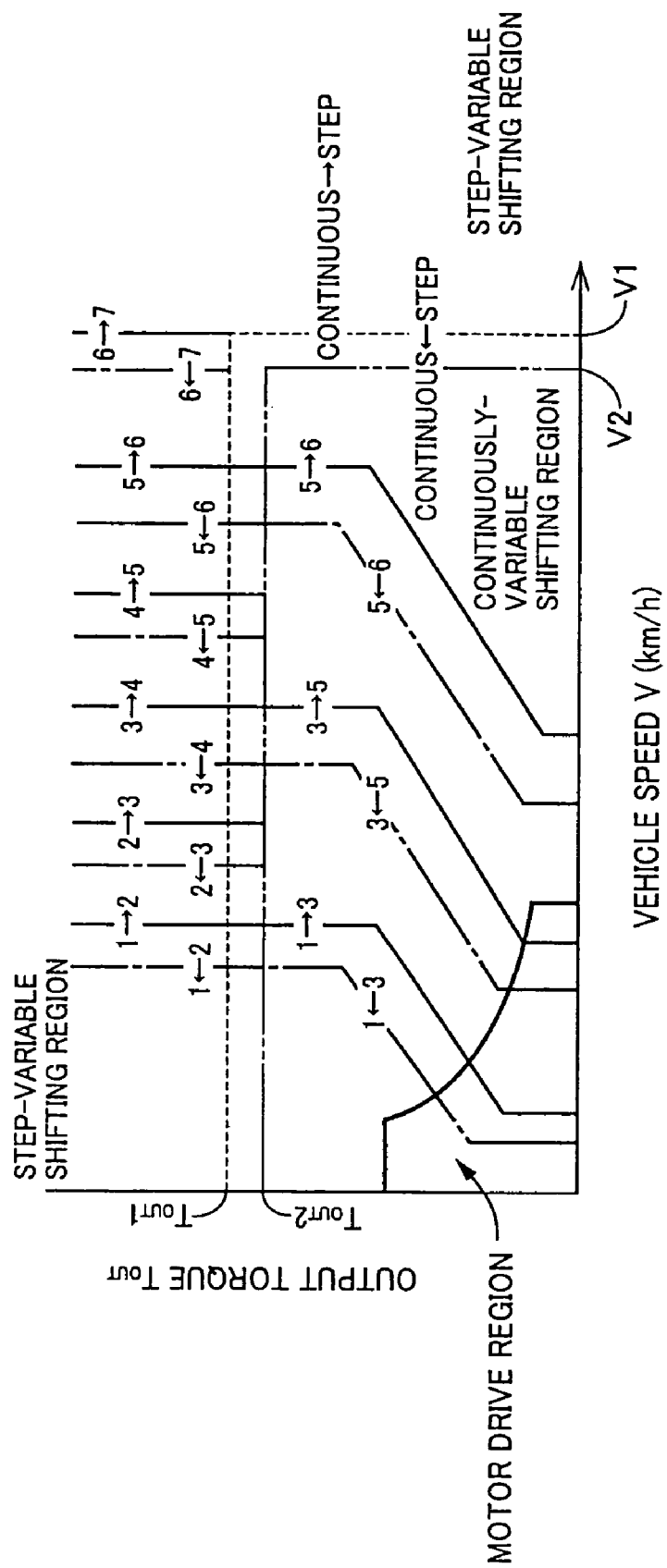
FIG. 7 is a view illustrating maps stored in the electronic control device of FIG. 6, which are used for shifting actions of a transmission portion of the power transmitting system, for switching between the continuously-variable and step-variable shifting states, and for switching between an engine drive mode and a motor drive mode.

The electronic control device 30 is configured to determine whether the power transmitting system 10 should be placed in the continuously-variable shifting state or in the step-variable shifting state. This determination is made according to a stored switching boundary line map and on the basis of a condition of the vehicle as represented by the actual running speed V, and a drive-force-related value such as an output torque $T_{OUT}$ of the transmission portion 20, which indicates a drive force of the vehicle. Examples of switching boundary lines defined by the switching boundary line map are indicated by broken and two-dot chain lines in FIG. 7. The switching boundary lines define a continuously-variable shifting region for selecting the continuously-variable shifting state, and a step-variable shifting region for selecting the step-variable shifting state. Described in detail, the electronic control device 30 determines whether a vehicle-condition point determined by the vehicle condition as represented by the vehicle speed V and the output torque $T_{OUT}$ lies in the continuously-variable shifting region or in the step-variable shifting region. When it is determined that the vehicle-condition point determined by the vehicle speed V and the output torque Tour lies in the step-variable shifting region, the electronic control device 30 inhibits a hybrid control or continuously-variable shifting action of the power transmitting system 10, and implements a step-variable shifting operation of the power transmitting system 10. When it is determined that the vehicle-condition point lines in the continuously-variable shifting region, the electronic control device 30 commands the hydraulic control unit 36 to release the switching clutch C0 and brake B0 for permitting a continuously-variable shifting action of the power distributing mechanism 16, and permits the hybrid control. The electronic control device 30 is further configured to determine whether a shifting action of the transmission portion 20 should take place. This determination is made according to a stored shifting boundary line map and on the basis of the vehicle condition described above. The shifting boundary line map represents shift-up boundary lines indicated by thin solid lines in FIG. 7, and shift-down boundary lines indicated by one-dot chain lines in FIG. 7. Namely, the transmission portion 20 is automatically shifted on the basis of the vehicle condition and according to the shift-up and shift-down boundary lines, by the appropriate engaging and releasing actions of the frictional coupling devices (except the switching clutch C0 and brake B0), as indicated in the table of FIG. 2. When the transmission portion 20 connected in series to the power distributing mechanism 16 is placed in one of the first through fourth gear positions while the power distributing mechanism 16 functions as the continuously-variable transmission, the rotating speed of the rotary motion transmitted from the power transmitting member 18 to the transmission portion 20 is continuously variable. That is, the overall speed ratio γT of the power transmitting system 10 is continuously variable in each of the first through fourth gear positions of the transmission portion 20, and between the adjacent ones of these gear positions, owing to the differential function of the power distributing mechanism 16.

The electronic control device 30 is also configured to determine whether the vehicle should be driven in the motor drive mode in which the vehicle is driven by the second electric motor M2, for example, with the electric CVT function or differential function of the power distributing mechanism 16, while the engine 8 is held at rest or in its idling state. This determination is made according to a stored drive-power-source switching boundary map and on the basis of the vehicle condition as represented by the vehicle speed V and the output torque $T_{OUT}$. The drive-power-source switching boundary map represents a boundary line defining a motor-drive region in which the vehicle should be driven in the motor drive mode, and an engine-drive region in which the vehicle should be driven in the engine drive mode. An example of this boundary line is indicated by thick sold line in FIG. 7.

Figure 9:
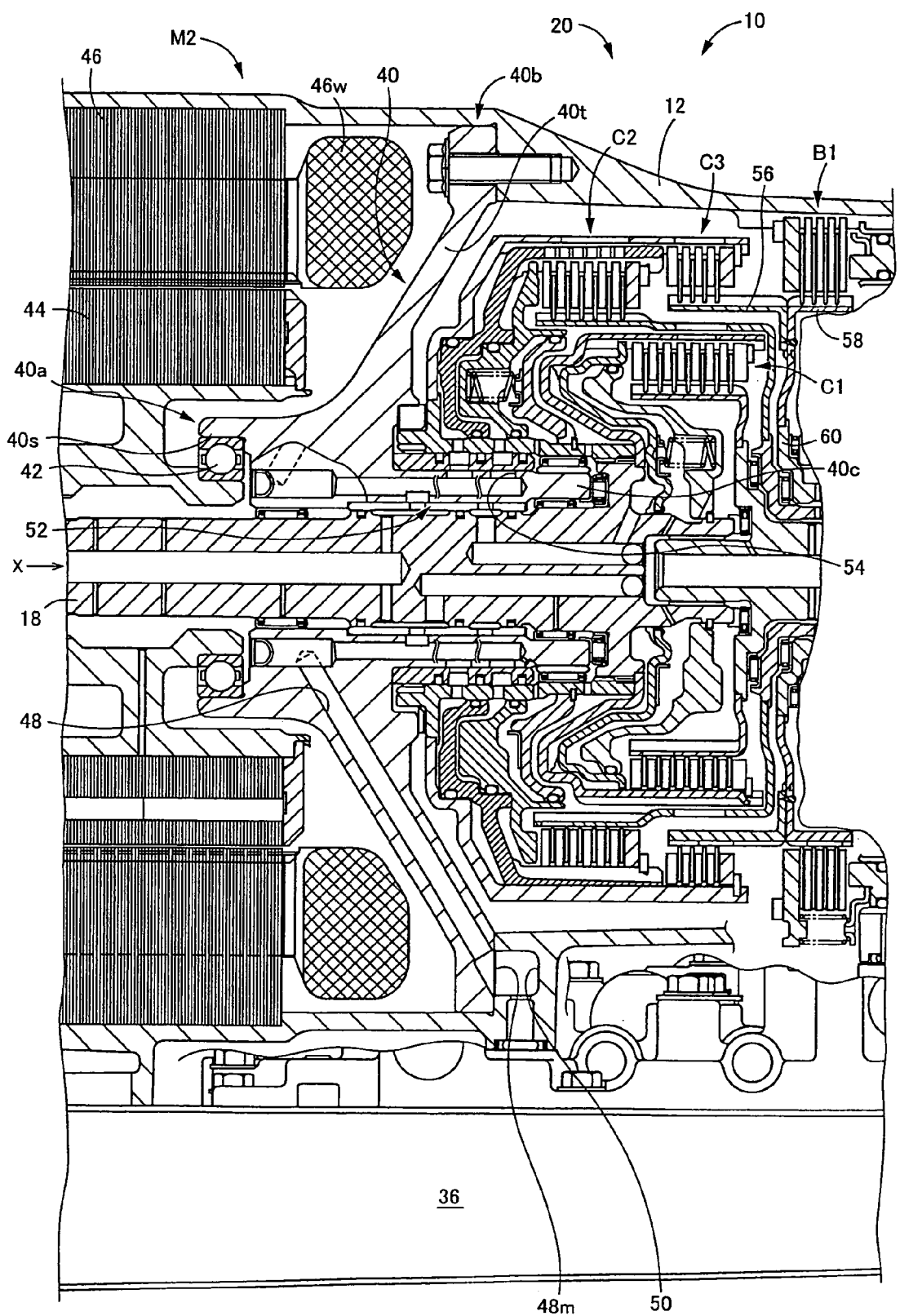
FIG. 9 is a cross sectional view of the power transmitting system of FIG. 1 taken in a plane including an axis of the system, to show an arrangement of a portion of the system in detail.

Referring next to the cross sectional view of FIG. 9, there is shown in detail an arrangement of a portion of the power transmitting system 10 of FIG. 1 in cross section taken in a plane including the axis of the system 10. As shown in FIG. 9, the power transmitting system 10 has a support member (center support) 40 which supports a rotor 44 of the second electric motor M2. This support member 40 includes axially opposite end portions 40a, 40b, and a major portion in the form of a tapered portion 40t having a diameter which increases in an axial direction from the one axial end portion 40a toward the other axial end portion 40b. The support member 40 further includes a support portion 40s in the axial end portion 40a, at which the rotor 44 of the second electric motor MG2 is supported rotatably about its as, through a bearing 42. The support member 40 is fixed at the other axial end portion 40b to the stationary member in the form of the casing 12. The second electric motor MG2 has a stator 46 which is disposed radially outwardly of the rotor 44 and which is fixed to the casing 12. The stator 46 has a winding portion 46w which is accommodated in a space formed between an inner circumferential surface of the casing 12 and an outer tapered circumferential surface of the tapered portion 40t.

The casing 12 is formed integrally with a structure of the hydraulic control unit 36 operable to generate the pressurized working fluid for controlling an operation of the power transmitting system 10, such that the hydraulic control unit 36 is located under the casing 12 (when the system 12 is installed on the body of the vehicle). The support member 40 has a plurality of fluid passages 48 (only one of which is shown in FIG. 9) formed therethrough for supplying the pressurized working fluid from the hydraulic control unit 36 to the clutches C and brakes B incorporated in the power transmitting system 10. These fluid passages 48 extend from the axial end portion 40b of the support member 40 toward a radially inner part of the support member 40 through the tapered portion 40t. Each of the fluid passages 48 has a circular shape in transverse cross section taken in a plane perpendicular to the direction of its extension, and an open end 48m corresponding to the axial end portion 40b. The open end 48m has an elliptical cross sectional shape formed by countersinking or counterboring in a plane (vertical plane as seen in FIG. 9) inclined with respect to the direction of extension of the fluid passage 48 having the circular cross sectional shape. Each fluid passage 48 is held in communication at the open end 48m with a fluid passage 50 which is formed through the casing 12 and which is held in communication with a fluid outlet of the hydraulic control unit 36. Namely, the open end 48m is formed for direct communication with the corresponding fluid passage 50 formed through the casing 12.

The support member 40 further includes an inner cylindrical portion 40c which extends from the axial end portion 40a (at which the rotor 44 is supported) in the axial direction into a radially central part of a space formed within or radially inwardly of the tapered portion 40t. The inner cylindrical portion 40c has a fluid passage portion 52 formed therein. The fluid passage portion 52 has a plurality of fluid passages for supplying the pressurized working fluid to the frictional coupling devices of the transmission portion 20 such as the clutches C and brakes B. The fluid passages formed in the fluid passage portion 52 include a plurality of fluid passages 54 (only two of which are shown in FIG. 9) which are open in the outer circumferential surface of the inner cylindrical portion 40c and which have respective open ends which are spaced apart from each other in the axial direction of the inner cylindrical portion 40c and which are open in the outer circumferential surface of the inner cylindrical portion 40c.

As shown in FIG. 9, the third dutch C3 and the first brake 131 of the transmission portion 20 are disposed adjacent to each other in the axial direction of the transmission portion 20. The these third clutch C3 and first brake B1 have respective hubs 56, 58 that are formed integrally with each other, and are supported by a common holder member 60 fixed to the sun gear S1 of the first planetary gear set 26. The hubs 56, 58 of the third clutch C3 and first brake B1 are disposed on the axially opposite sides of the holder member 60, as shown in FIG. 9.

In the power transmitting system 10 constructed as described above, the provision of the support member 40 including the tapered portion 40t as its major portion permits reduction of the axial dimension of the power transmitting system 10 as compared with that of the prior art power transmitting system. That is, the winding portion 46w of the stator 46 is disposed in the space formed radially outwardly of the tapered portion 40t, namely, between the outer circumferential surface of the tapered portion 40t and the inner circumferential surface of the casing 12, while the fluid passage portion 52 is disposed in the space formed radially inwardly of the tapered portion 40t. This arrangement makes it possible to reduce an axial distance between the winding portion 46w of the stator 46 and the fluid passage portion 52, as compared with that in the arrangement of the prior art power transmitting system that does not include the tapered portion 40t. Further, the space formed radially inwardly of the tapered portion 40t makes it possible to reduce an axial distance between the first clutch C1 and the support member 40, as compared with that in the prior art power transmitting system not including the tapered portion 40t, so that the hubs 56, 58 of the third clutch C3 and first brake B1 can be disposed on the respective axially opposite sides of the common holder member 60. The present arrangement of the power transmitting system 10 permits not only reduction of the axial dimensions of the hubs 56, 58 of the third clutch C3 and first brake B1, but also effective prevention of flexure of the hubs 56, 58 due to centrifugal force, making it possible to reduce a problem of stress of the third clutch C3 which is likely to be operated at a comparatively high speed.

Figure 10:
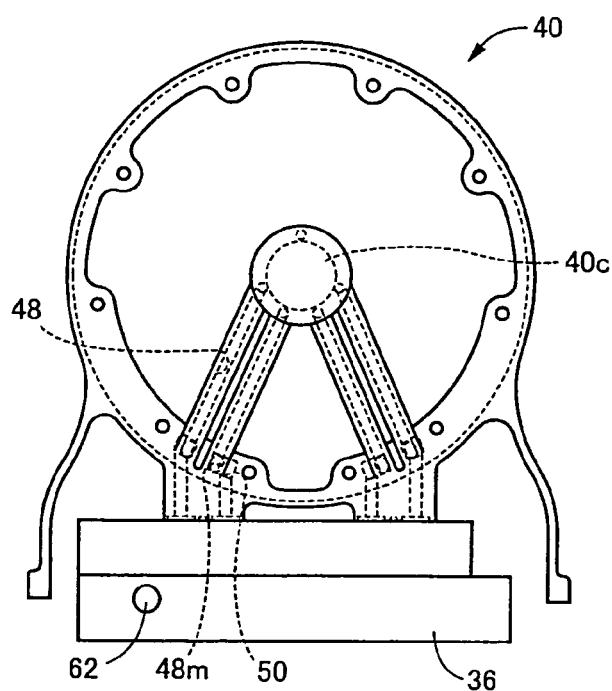
FIG. 10 is a front elevational view showing a support member provided in the power transmitting system of FIG. 1, as seen in a direction indicated by an arrow-headed line X in FIG. 9.
Figure 11:
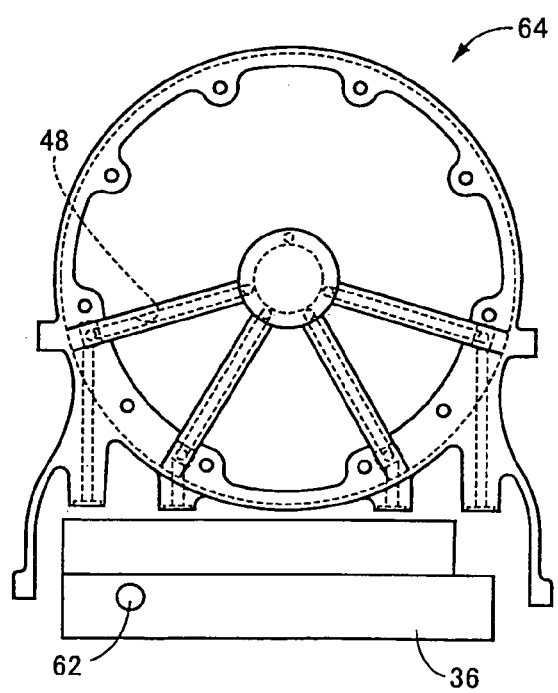
FIG. 11 is a front elevational view showing a support member provided in a prior art vehicular power transmitting system and not including a tapered portion, as seen in the same direction as in FIG. 10.

FIG. 10 a front elevational view showing the support member 40 as seen in a direction indicated by an arrow-headed line X in FIG. 9, while FIG. 11 is a front elevational view showing a support member 64 provided in the prior art power transmitting system and not including a tapered portion, as seen in the same direction as in FIG. 10. The fluid passages 48 formed in the tapered portion 40t of the support member 40 according to the present embodiment of the invention shown in FIG. 10 are held in communication with the respective fluid passages 50 formed in the casing 12, at the open ends 48m which are formed in the end portion 40b of the support member 40 and each of which has the elliptical shape in cross section taken in the plane inclined with respect to the centerline of the fluid passage 48 having a circular cross sectional shape. The thus formed fluid passages 48 do not require capping at the open ends 48m. On the other hands, fluid passages 48 formed in the support member 64 in the prior art power transmitting system shown in FIG. 11 are required to extend in the axial direction of the support member 64, for providing open ends for communication with the hydraulic control unit 36. In this respect, the support member 40 including the tapered portion 40t according to the present embodiment makes it possible to reduce the required axial dimension of the power transmitting system 10. In addition, the support member 40 according to the present embodiment permits the open ends 48m of the fluid passages 48 to be located closer to a position right below the axis of the system 10, than the support member 64 of FIG. 11, as seen in the plane of FIGS. 10 and 11, namely, located closer to the position of a manual valve 62 of the hydraulic control unit 36, whereby the required lengths of the fluid passages 48, 50 formed through the support member 40 and casing 12 can be effectively reduced as compared with those of fluid passages in the prior art arrangement.

In the vehicular power transmitting system 10 constructed according to the present embodiment of the invention, the support member 40 for supporting the rotor 44 of the second electric motor M2 includes the support portion 40s formed in its one axial end portion 40a, at which the rotor 44 is supported rotatably about its axis, and the tapered portion 40t having the diameter increasing in the axial direction from the above-indicated one axial end portion 40a to the other axial end portion 40b at which the support member 40 is fixed to the casing 12. The winding portion 46w of the stator 46 of the second electric motor M2 is disposed in the space formed radially outwardly of the tapered portion 40t, while the fluid passage portion 52 for supplying the working fluid to the frictional coupling devices C, B of the transmission portion 20 is disposed in the space formed radially inwardly of the tapered portion 40*t*. The provision of the support member 40 including the tapered portion 40*t* permits reduction of the axial dimension of the vehicular power transmitting system 10 as compared with that of the prior art vehicular power transmitting system in which the support member 64 does not include the tapered portion 40*t*. Thus, the present embodiment provides the vehicular power transmitting system 10 the overall axial dimension of which can be effectively minimized.

The present embodiment is further arranged such that the tapered portion 40*t* has the fluid passages 48 formed therethrough so as to extend from the above-indicated other axial end portion 40*b* toward the radially inner part of the support member 40. Each of these fluid passages 48 has the circular shape in transverse cross section, and the open end 48*m* having the elliptical shape in cross section taken in the plane inclined with respect to the direction of extension of the fluid passage 48, each fluid passage 48 being held in communication at the open end 48*m* with the fluid passage 50 formed in the casing 12. In the present vehicular power transmitting system 10 according to the present embodiment, the axial dimension can be made smaller than in the prior art vehicular power transmitting system wherein the support member 64 does not include the tapered portion 40*t*. Thus, the prevent embodiment provides the vehicular power transmitting system 10 the overall axial dimension of which can be effectively minimized.

The present embodiment is further arranged such that the inner cylindrical portion 40*c* of the support member 40 extends from the above-indicated one axial end portion 40*a* in the axial direction of the support member 40 into the space formed radially inwardly of the tapered portion 40*t*, and has the plurality of fluid passages 54 open in its outer circumferential surface and has the respective open ends that are spaced apart from each other in its axial direction. Thus, the open ends of the fluid passages 54 formed through the inner cylindrical portion 40*c* are located in a radially inner part of the power transmitting system 10, whereby the system 10 can be effectively small-sized according to the illustrated embodiment.

The present embodiment is further arranged such that the hydraulic control unit 36 which is provided to generate the hydraulic pressure for controlling an operation of the vehicular power transmitting system 10 is formed integrally with the casing 12 such that the hydraulic control unit 36 is located under the casing 12, so that the overall axial dimension of the power transmitting system 10 can be effectively minimized according to the illustrated embodiment.

The present embodiment is further arranged such that the transmission portion 20 includes the third clutch C3 and the first brake B1 which are disposed adjacent to each other in the axial direction of the transmission portion 20, and further includes the common holder member 60 which holds the hub 56 of the third clutch C3 and the hub 58 of the first brake B1 such that the hubs 56, 58 of the third clutch C3 and first brake B1 are disposed on the respective axially opposite sides of the holder member 60. Accordingly, the axial dimension of the power transmitting system 10 can be made smaller than in the prior art vehicular power transmitting system wherein the support member 64 does not include the tapered portion 40*t*. Thus, the prevent embodiment provides the vehicular power transmitting system 10 the overall axial dimension of which can be effectively minimized.

In the illustrated power transmitting system 10, the second electric motor M2 and the third clutch C3 are both fixed to the power transmitting member 18 which is the input rotary member of the transmission portion 20. The overall axial dimension of the system 10 provided with the electric motor M2 and clutch C3 fixed to the power transmitting member 18 can be effectively minimized according to the illustrated embodiment.

In the illustrated power transmitting system 10, the transmission portion 20 is a step-variable transmission having a plurality of gear positions which are selectively established. The overall axial dimension of this system 10 provided with the step-variable transmission can be effectively minimized according to the illustrated embodiment.

In the illustrated power transmitting system 10, the electrically controlled differential portion in the form of the power distributing mechanism 16 includes the planetary gear set 24, and the first electric motor M1 fixed to the sun gear S0 of the planetary gear set 24. The overall axial dimension of this system 10 provided with the planetary gear set 24 and the first electric motor M1 can be effectively minimized according to the illustrated embodiment.

In the illustrated power transmitting system 10, the electrically controlled differential portion functions as a continuously-variable transmission according to a change of the operating speed of the second electric motor M2. The overall axial dimension of this system 10 provided with the electrically controlled differential portion 16 operable as the continuously-variable transmission can be effectively minimized.

While the preferred embodiment of this invention has been described in detail by reference to the accompanying drawings, it is to be understood that the present invention is not limited to the illustrated embodiment, but may be otherwise embodied.

The power transmitting system 10 according to the illustrated embodiment is arranged such that the power distributing mechanism 16 is switchable between the differential and non-differential state, to switch the power transmitting system 10 between the continuously-variable shifting state in which the system 10 functions as the electrically controlled continuously-variable transmission, and the step-variable shifting state in which the system 10 functions as the step-variable transmission. This switching between of the system 10 between the continuously-variable and step-variable shifting states is one form of switching corresponding to the switching of the power distributing mechanism 16 between the differential and non-differential states. However, the power transmitting system 10 may function as the step-variable transmission even in the differential state of the power distributing mechanism 16, by changing the speed ratio of the power distributing mechanism 16 non-continuously or in steps. In other words, the differential and non-differential states of the power distributing mechanism 16 do not always correspond to the continuously-variable and step-variable shifting states of the power transmitting system 10, and the system 10 need not be switchable between the continuously-variable and step-variable shifting states, provided the power distributing mechanism 16 is switchable between the differential and non-differential states.

The power transmitting system 10 according to the illustrated embodiment is provided with the switching clutch C0 and the switching brake B0, which are controlled to place the power distributing mechanism 16 in the step-variable shifting state in which the power distributing mechanism 16 functions as the step-variable transmission, or the continuously-variable shifting state in which the mechanism 16 functions as the continuously-variable transmission. However, the present invention is equally applicable to a power transmitting system which is not provided with the switching clutch C0 and brake B0 and which is not capable of switching the power distributing mechanism 16 between the step-variable and continuously-variable shifting states. This modification does not require the switching boundary line map which defines the step-variable and continuously-variable shifting regions indicated in FIG. 7.

In the power distributing mechanism 16 in the illustrated embodiment, the carrier CA0 is fixed to the engine 8, and the sun gear S0 is fixed to the first electric motor M1 while the ring gear R0 is fixed to the power transmitting member 18. However, this arrangement is not essential. The engine 8, first electric motor M1 and power transmitting member 18 may be fixed to any other elements selected from the three elements CA0, S0 and R0 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14. Further, the engine 8 and the input shaft 14 need not disposed coaxially with each other.

In the illustrated embodiment, the first and second electric motors M1 and M2 are disposed coaxially with the input shaft 14, and the first electric motor M1 is fixed to the sun gear S90, while the second electric motor M2 is fixed to the power transmitting member 18. However, this arrangement is not essential. For example, the first and second electric motors M1, M2 may be operatively connected to the sun gear S0 and the power transmitting member 18, respectively, through gears or belts, for instance.

Although the power distributing mechanism 16 in the illustrated embodiment is provided with the switching clutch C0 and the switching brake B0, the power distributing mechanism 16 need not be provided with both of these switching clutch C0 and brake B0, but may be provided with only of the switching clutch C0 and brake B0. While the switching clutch C0 is provided to selectively connect the sun gear S0 and the carrier CA0, the switching clutch C0 may be provided to selectively connect the sun gear S0 and the ring gear R0, or the carrier CA0 and the ring gear R0. That is, the switching clutch C0 is required to selectively connect two elements of the three rotary elements of the planetary gear set 24.

The hydraulically operated frictional coupling devices provided in the illustrated embodiment such as the switching clutch C0 and the switching brake B0 may be replaced by any other magnetic, electromagnetic and mechanical coupling devices such as magnetic power clutches, electromagnetic clutches and meshing type dog clutches.

The power transmitting mechanism 16 provided in the illustrated embodiment may be replaced by a differential gear device having a pinion driven by the engine, and a pair of bevel gears which mesh with the pinion and which are operatively connected to the first electric motor M1 and the second electric motor M2.

While the power distributing mechanism 16 provided in the illustrated embodiment is constituted by one planetary gear set, the power distributing mechanism may be constituted by two or more planetary gear sets and may function as a step-variable transmission having three or more gear positions when the power distributing mechanism is placed in the non-differential state (fixed-speed-ration shifting state).

The illustrated power transmitting system 10 has a total of seven forward-drive gear positions including two intermediate gear positions in the form of the second and fourth gear positions established when the power distributing mechanism 16 is shifted to a high-speed position with the switching brake B0 placed in the engaged state. However, the power transmitting system may have a total of six forward-drive gear positions including only one intermediate position in the form of the second or fourth gear position, or a total of eight gear positions including three intermediate gear positions which consists of the second and fourth gear positions and a gear position between the fifth and sixth gear positions.

It is to be understood that the present invention may be embodied with various other changes which may occur to those skilled in the art, without departing from the spirit and scope of the invention defined in the appended claims.

What is claimed is:

1. A vehicular power transmitting system comprising:
   a transmission portion constituting a part of a power transmitting path and including frictional coupling devices;
   an electric motor connected to the power transmitting path and including a rotor, and a stator having a winding portion;
   an electrically controlled differential portion connected to the electric motor, and having a differential state between rotating speeds of its input and output shafts, which differential state is controllable according to a change of an operating speed of the electric motor;
   a casing accommodating said transmission portion, said electric motor and said electrically controlled differential portion; and
   a support member for supporting said rotor of the electric motor, said support member including a support portion formed in one axial end portion thereof, at which the rotor is supported rotatably about its axis, and a tapered portion having a diameter which increases in an axial direction from said one axial end portion toward the other axial end portion at which the support member is fixed to said casing,
   and wherein said winding portion of the stator of the electric motor is disposed in a space formed radially outwardly of said tapered portion, while a fluid passage portion for supplying a working fluid to said frictional coupling devices of the transmission portion is disposed in a space formed radially inwardly of said tapered portion.

2. The vehicular power transmitting system according to claim 1, wherein said tapered portion has fluid passages formed therethrough so as to extend from said other axial end portion toward a radially inner part of the support member, each of the fluid passages having a circular shape in transverse cross section, and an open end having an elliptical shape in cross section taken in a plane inclined with respect to a direction of extension of the fluid passage, said each fluid passage being held in communication at said open end with a fluid passage formed in said casing.

3. The vehicular power transmitting system according to claim 1, wherein said frictional coupling devices of the transmission portion include a clutch and a brake which are disposed adjacent to each other in an axial direction of the transmission portion, and further includes a holder member which holds a hub of the clutch and a hub of the brake such that the hubs of the clutch and brake are disposed on respective axially opposite sides of said holder member.

4. The vehicular power transmitting system according to claim 1, wherein said support member further includes a plurality of fluid passages formed through said tapered portion so as to extend from said other axial end portion toward a radially inner part of the support member, and an inner cylindrical portion extending from said one axial end portion in an axial direction of the support member into the space formed radially inwardly of said tapered portion, said inner cylindrical portion having the plurality of fluid passages open in an outer circumferential surface thereof and having respective open ends that are spaced apart from each other in an axial direction of the inner cylindrical portion.

5. The vehicular power transmitting system according to claim 1, further comprising a hydraulic control unit which is provided to generate a hydraulic pressure for controlling an operation of the vehicular power transmitting system and which is formed integrally with said casing.

6. The vehicular power transmitting system according to claim 1, wherein the transmission portion is a step-variable transmission having a plurality of gear positions which are selectively established.

7. The vehicular power transmitting system according to claim 1, wherein the electrically controlled differential portion includes a planetary gear set having rotary elements, and at least one electric motor fixed to one of said rotary elements.

8. The vehicular power transmitting system according to claim 1, wherein the electrically controlled differential portion functions as a continuously-variable transmission according to a change of the operating speed of the electric motor.

9. A vehicular power transmitting system comprising;
a transmission portion constituting a part of a power transmitting path;
an electric motor connected to the power transmitting path and including a rotor;
an electrically controlled differential portion connected to the electric motor, and having a differential state between rotating speeds of its input and output shafts, which differential state is controllable according to a change of an operating speed of the electric motor;
a casing accommodating said transmission portion, said electric motor and said electrically controlled differential portion; and
a support member for supporting said rotor of the electric motor, said support member including a support portion formed in one axial end portion thereof, at which the rotor is supported rotatably about its axis, and a tapered portion having a diameter which increases in an axial direction from said one axial end portion toward the other axial end portion at which the support member is fixed to said casing,
and wherein said support member has fluid passages formed through said tapered portion so as to extend from said other axial end portion toward a radially inner part of the support member, each of said fluid passages having a circular shape in transverse cross section taken in a plane perpendicular to a direction of its extension,
said each fluid passage having an open end which corresponds to said other axial end portion and which has an elliptical shape in cross section taken in a plane inclined with respect to the direction of extension of the fluid passage, said each fluid passage communicating at said open end with a fluid passage formed through said casing.

10. The vehicular power transmitting system according to claim 9, wherein said support member further includes an inner cylindrical portion extending from said one axial end portion in an axial direction of the support member into the space formed radially inwardly of said tapered portion, said inner cylindrical portion having a plurality of fluid passages open in an outer circumferential surface thereof and having respective open ends that are spaced apart from each other in an axial direction of the inner cylindrical portion.

11. The vehicular power transmitting system according to claim 9, further comprising a hydraulic control unit which is provided to generate a hydraulic pressure for controlling an operation of the vehicular power transmitting system and which is formed integrally with said casing.

12. The vehicular power transmitting system according to claim 9, wherein the transmission portion is a step-variable transmission having a plurality of gear positions which are selectively established.

13. The vehicular power transmitting system according to claim 9, wherein the electrically controlled differential portion includes a planetary gear set having rotary elements, and at least one electric motor fixed to one of said rotary elements.

14. The vehicular power transmitting system according to claim 9, wherein the electrically controlled differential portion functions as a continuously-variable transmission according to a change of the operating speed of the electric motor.

15. A vehicular power transmitting system comprising:
a transmission portion constituting a part of a power transmitting path and including a clutch and a brake that are disposed adjacent to each other in an axial direction thereof;
an electric motor connected to the power transmitting path and including a rotor;
an electrically controlled differential portion connected to the electric motor, and having a differential state between rotating speeds of its input and output shafts, which differential state is controllable according to a change of an operating speed of the electric motor;
a casing accommodating said transmission portion, said electric motor and said electrically controlled differential portion;
a support member for supporting said rotor of the electric motor, said support member including a support portion formed in one axial end portion thereof, at which the rotor is supported rotatably about its axis, and a tapered portion having a diameter which increases in an axial direction from said one axial end portion toward the other axial end portion at which the support member is fixed to said casing; and
a holder member for holding a hub of said clutch and a hub of said brake such that said hubs of the clutch and brake are disposed on respective axially opposite sides of said holder member.

16. The vehicular power transmitting system according to claim 15, wherein the transmission portion has an input rotary member, and said electric motor and said clutch are both fixed to said input rotary member.

17. The vehicular power transmitting system according to claim 15, wherein the transmission portion is a step-variable transmission having a plurality of gear positions which are selectively established.

18. The vehicular power transmitting system according to claim 15, wherein the electrically controlled differential portion includes a planetary gear set having rotary elements, and at least one electric motor fixed to one of said rotary elements.

19. The vehicular power transmitting system according to claim 15, wherein the electrically controlled differential portion functions as a continuously-variable transmission according to a change of the operating speed of the electric motor.

* * * * *